United States Patent
Gantait

(10) Patent No.: US 11,157,857 B2
(45) Date of Patent: Oct. 26, 2021

(54) QUALITY-BASED AUTOMATED APPLICATION-PORTFOLIO RATIONALIZATION

(71) Applicant: INTERNATIONAL BUSINESS MACHINES CORPORATION, Armonk, NY (US)

(72) Inventor: Amitranjan Gantait, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 15/903,525

(22) Filed: Feb. 23, 2018

(65) Prior Publication Data

US 2019/0266539 A1   Aug. 29, 2019

(51) Int. Cl.
   *G06Q 10/06*   (2012.01)
   *G06Q 10/10*   (2012.01)

(52) U.S. Cl.
   CPC ... *G06Q 10/06395* (2013.01); *G06Q 10/0637* (2013.01); *G06Q 10/06313* (2013.01); *G06Q 10/06393* (2013.01); *G06Q 10/10* (2013.01)

(58) Field of Classification Search
   CPC ....... G06Q 10/06395; G06Q 10/06313; G06Q 10/0637; G06Q 10/06393; G06Q 10/10
   See application file for complete search history.

(56) References Cited

U.S. PATENT DOCUMENTS

| | | | | |
|---|---|---|---|---|
| 2006/0095309 A1* | 5/2006 | Mangan | ............ | G06Q 10/00 717/123 |
| 2007/0078702 A1 | 4/2007 | Tandon | | |
| 2010/0057520 A1* | 3/2010 | Rejai | .................. | G06Q 10/087 705/7.36 |

(Continued)

FOREIGN PATENT DOCUMENTS

CA   2461975 A1 *  9/2005   ............ G06Q 10/04

OTHER PUBLICATIONS

Robert Chiang, Strategic alignment and value maximization for IT project portfolios, May 29, 2012 (Year: 2012).*
NIIT Technologies White Paper; Application Portfolio Rationalization—Transforming your application portfolio; www.niit-tech.com; retrieved from the Internet Mar. 1, 2017; 13 pages.

(Continued)

*Primary Examiner* — Mohamed N El-Bathy
(74) *Attorney, Agent, or Firm* — Schmeiser, Olsen & Watts; Nicholas L. Cadmus

(57) ABSTRACT

An automated portfolio-rationalization module of an application-portfolio management system selects and applies a set of consolidation decisions in order to reduce complexity of and maximize return on investment of a portfolio of software applications. The system identifies consolidation decisions for each application based on that application's technical quality and business quality and computes the cost to apply each decision. The system then organizes nonconflicting subsets of these decisions into opportunities, where each opportunity contains a set of triplets that each identifies one of the decisions and its associated cost. Non-conflicting subsets of these opportunities are further combined into feasible opportunity sets. The system compares the returns on investment that would be generated by applying each of these opportunity sets to the portfolio. The set that would produce a globally or locally maximum return is then implemented by applying the set's application-decommissioning, enhancement, and modernization decisions to the portfolio.

19 Claims, 4 Drawing Sheets

(56) References Cited

U.S. PATENT DOCUMENTS

| | | | |
|---|---|---|---|
| 2011/0066570 A1* | 3/2011 | Kolo | G06Q 40/06 705/36 R |
| 2014/0122762 A1 | 5/2014 | Yu et al. | |
| 2015/0186133 A1 | 7/2015 | Yarra et al. | |
| 2016/0267600 A1 | 9/2016 | Nagaraja et al. | |

OTHER PUBLICATIONS

Neogi, Sombit; Application Portfolio Rationalization: How IT Simplification and Standardization Ensure Business Growth; www.tcs.com; retrieved from the Internet Mar. 1, 2017; 2 pages.

* cited by examiner

Input: Set of opportunities
Output: All feasible opportunity sets that meet APR objectives
Opportunity firstOpp = first element of the opportunity set
Initialize AllCombinations = {}
GenerateCombinations (AllCombinations, {}, firstOpp)
For each combination in AllCombinations
   Get consolidated app recommendations
   Identify target portfolio based on recommendations
   Calculate target portfolio cost
EndFor Sort AllCombinations based on target portfolio cost GenerateCombinations (ResultSet, CurrentSet, currentOpportunity)
If(CurrentSet is not empty)
   ResultSet = ResultSet ∪ CurrentSet
For all remaining opportunities oppty in opportunity set
   If(oppty not member of CurrentSet)
     If(oppty *isFeasible* with other opportunities in the CurrentSet)
       CurrentSet = CurrentSet ∪ oppty
       GenerateCombinations (ResultSet, CurrentSet, oppty)
     EndIf
   EndIf
Endfor

FIG. 3

QUALITY-BASED AUTOMATED APPLICATION-PORTFOLIO RATIONALIZATION

BACKGROUND

The present invention relates to information technology in general and relates in particular to the technology of automated application-portfolio rationalization.

Businesses need to constantly manage their portfolios of software application in order to identify which applications to maintain, enhance, replace, or decommission. As Application Portfolio ages and expands due to acquisition or developing new business capabilities, more and more applications may become redundant or obsolete. Because managing a complex portfolio may be a complex and burdensome task, an IT Department defer the task to a software-based technology known as Application Portfolio Rationalization (APR) or Enterprise Application Management.

Rationalization is a process by which a portfolio is reorganized in order to better align the portfolio with business objectives, to lower the portfolio's total cost of ownership (TCO), and to increase the value returned by the portfolio applications. APR systems provide a variety of organizational and visualization functionality that supports a business's efforts to better align portfolio applications with business goals, reduce overall portfolio complexity, and identify, decommission, update, reconfigure, combine, or replace applications as needed to eliminate redundant or unneeded functionality. But although APR systems may provide tools that support a business's efforts to attain such goals, known APR systems are not sophisticated enough to automatically achieve these goals themselves, including generating recommendations to perform such activities.

Current APR technology may exploit the computerization and communications capabilities of enterprise computer networks to provide integrated cross-platform application tracking, scenario analysis, interactive real-time visualization, business-modeling, budgeting, and resource-planning functionality. Such systems are often limited to proprietary spreadsheet applications or online Web-based tools that merely facilitate management or visualization of a portfolio in order to support analysts and architects attempting to devise a rationalization strategy.

See, e.g., https://www.servicenow.com/products/application-portfolio-management.html and http://www.planview.com/tapm-application-portfolio-management.

Known portfolio-rationalization systems, however, cannot automatically infer nuanced relationships among business objectives, application functionality, and portfolio. APR systems may perform intermediate functions like predicting how an application revision would disrupt business operations, collecting and organizing lifecycle data for specific applications, monitor compliance with vendor update recommendations, interact with project-management systems during application-update efforts, and provide a continuously updated view of a portfolio's current status. However, such systems cannot automatically translate this information into a rationalization plan by automatically identifying how best to consolidate a portfolio or by automatically performing such a consolidation or directing downstream systems to perform such a consolidation.

Instead, existing systems merely automate the identification, organization, and delivery of information needed by business and IT stakeholders, such as enterprise architects and application experts, to develop its own consolidation recommendations and rationalization plan—an effort that, even with the help of an APR system, can take more than half a year.

Known APR systems suffer from this problem because of the difficulty of a software-based system to determine whether specific applications remain technically sound and are functionally capable of meeting current and future business objectives. Even if they could perform such an analysis, current APR technology is not capable of generating a set of possible rationalization plans of or selecting from such a set of possible rationalization plans an alternative that is likely or that is most likely to provide an optimal long-term strategy.

SUMMARY

An embodiment of the present invention is an application-portfolio rationalization module of an application-portfolio management system comprising a processor, a memory coupled to the processor, and a computer-readable hardware storage device coupled to the processor, the storage device containing program code configured to be run by the processor via the memory to implement a method for quality-based automated application-portfolio rationalization, the method comprising:

receiving, by the system, information about a portfolio of software applications;

assigning, by the system, to each application of the portfolio a technical-quality value and a business-quality value;

associating, by the system, each application of the portfolio with at least one rationalization decision, where applying a first rationalization decision to a first application incurs a first rationalization cost, and where the first rationalization decision and the first rationalization cost are determined as a function of the received information, of a complexity of the first application, of a technical-quality value of the first application, and of a business-quality value of the first application;

generating, by the system, all feasible consolidation opportunities, where each opportunity of the generated opportunities identifies a unique nonconflicting subset of the associated of rationalization decisions;

selecting, by the system, two or more feasible opportunity sets, where each set of the selected opportunity sets identifies a unique nonconflicting subset of the generated consolidation opportunities;

predicting, by the system, a return on investment of each selected opportunity set;

choosing, by the system, an optimal opportunity set of the selected opportunity sets that provides a greatest return on investment; and decommissioning, by the system, portfolio applications identified by the optimal opportunity set as being subject to decommissioning.

Another embodiment of the present invention is a method for quality-based automated application-portfolio rationalization, the method comprising:

an application-portfolio rationalization module of an application-portfolio management system receiving information about a portfolio of software applications;

the system assigning to each application of the portfolio a technical-quality value and a business-quality value;

the system associating each application of the portfolio with at least one rationalization decision, where applying a first rationalization decision to a first application incurs a first rationalization cost, and where the first rationalization decision and the first rationalization cost are determined as a function of the received information, of a complexity of the first application, of a technical-quality value of the first application, and of a business-quality value of the first application;

the system consolidating two rationalization decisions associated with a same application of the portfolio into a single consolidated rationalization decision, where the single consolidated rationalization decision is associated with a consolidated rationalization cost that is a function of a sum of rationalization costs associated with the two rationalization decisions;

the system generating all feasible consolidation opportunities, where each opportunity of the generated opportunities identifies a unique nonconflicting subset of the associated of rationalization decisions;

the system selecting two or more feasible opportunity sets, where each set of the selected opportunity sets identifies a unique nonconflicting subset of the generated consolidation opportunities;

the system predicting a return on investment of each selected opportunity set;

the system choosing an optimal opportunity set of the selected opportunity sets that provides a greatest return on investment; and the system decommissioning portfolio applications identified by the optimal opportunity set as being subject to decommissioning.

Yet another embodiment of the present invention is a computer program product, comprising a computer-readable hardware storage device having a computer-readable program code stored therein, the program code configured to be executed by an application-portfolio rationalization module of an application-portfolio management system comprising a processor, a memory coupled to the processor, and a computer-readable hardware storage device coupled to the processor, the storage device containing program code configured to be run by the processor via the memory to implement a method for quality-based automated application-portfolio rationalization, the method comprising:

receiving, by the system, information about a portfolio of software applications;

assigning, by the system, to each application of the portfolio a technical-quality value and a business-quality value;

associating, by the system, each application of the portfolio with at least one rationalization decision, where applying a first rationalization decision to a first application incurs a first rationalization cost, and where the first rationalization decision and the first rationalization cost are determined as a function of the received information, of a complexity of the first application, of a technical-quality value of the first application, and of a business-quality value of the first application;

consolidating, by the system, two rationalization decisions associated with a same application of the portfolio into a single consolidated rationalization decision, where the single consolidated rationalization decision is associated with a consolidated rationalization cost that is a function of a sum of rationalization costs associated with the two rationalization decisions;

generating, by the system, all feasible consolidation opportunities, where each opportunity of the generated opportunities identifies a unique nonconflicting subset of the associated of rationalization decisions;

selecting, by the system, two or more feasible opportunity sets, where each set of the selected opportunity sets identifies a unique nonconflicting subset of the generated consolidation opportunities;

predicting, by the system, a return on investment of each selected opportunity set;

choosing, by the system, an optimal opportunity set of the selected opportunity sets that provides a greatest return on investment; and decommissioning, by the system, portfolio applications identified by the optimal opportunity set as being subject to decommissioning.

BRIEF DESCRIPTION OF THE DRAWINGS

FIG. 3 shows pseudocode for generating all possible combinations of opportunities for a given opportunity set, in accordance with embodiments of the present invention.

DETAILED DESCRIPTION

Figure 1:
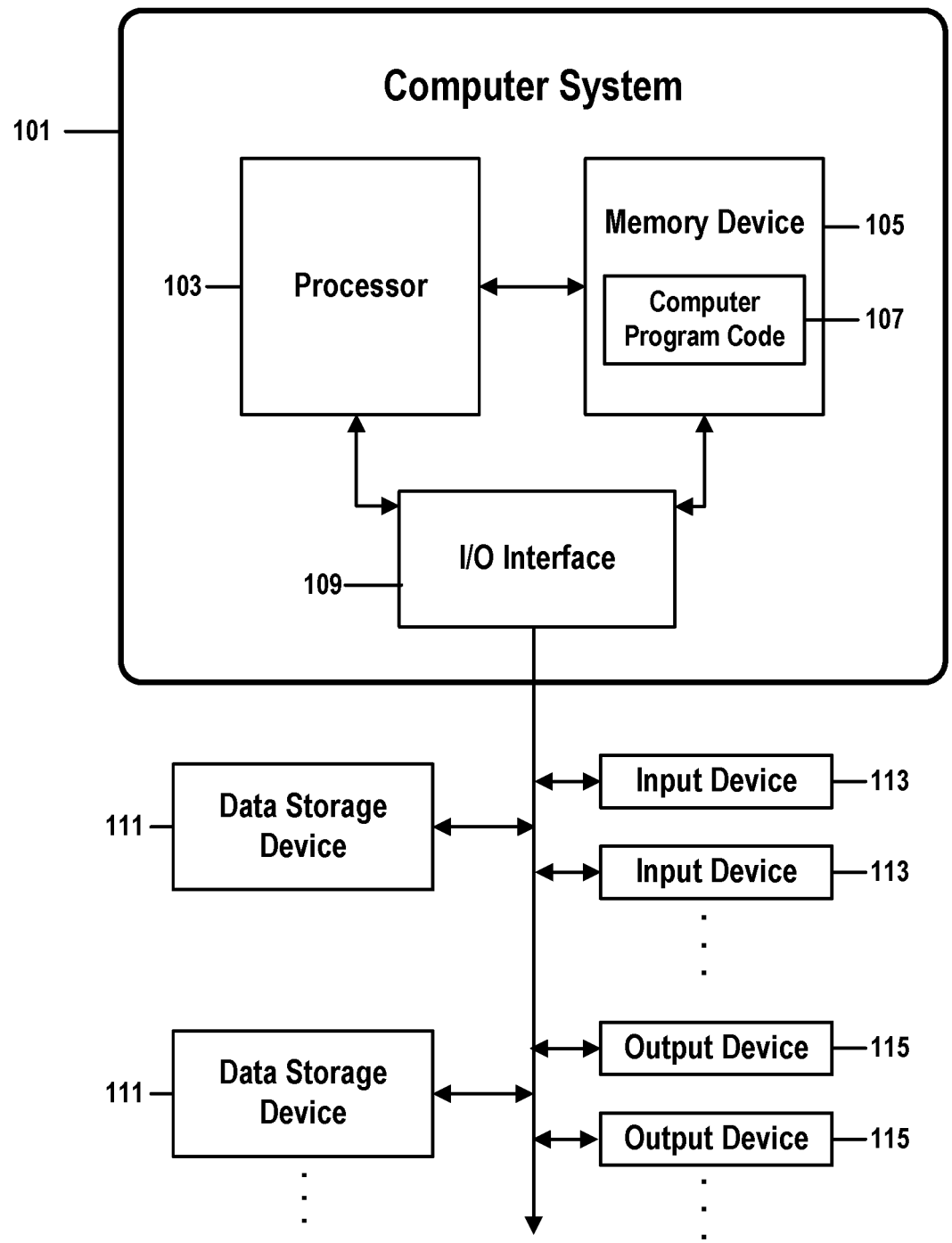
FIG. 1 shows a structure of a computer system and computer program code that may be used to implement a method for quality-based automated application-portfolio rationalization in accordance with embodiments of the present invention.

The present invention improves the functioning of known Application Portfolio Rationalization (APR) systems by providing a technical solution to a technical problem rooted in current automated-rationalization technology. Unlike traditional rationalization-like procedures undertaken by humans, current APR systems do not have the ability to make consolidation decisions based on inferred relationships between business objectives and portfolio applications. Most current APR systems can do no more than collect and organize information about portfolio applications and then present that collected data to stakeholders, forcing recipients to analyze and consider the received data by means of a complex, often months-long, analysis. Even the most sophisticated APR tools, when presented with sets of consolidation opportunities, are not able to automatically select, or even approximate, a globally or locally optimal or best-suited set. The present invention improves these technologies by providing a computer-implemented method for selecting a set of consolidation opportunities that maximizes rationalization benefits.

This document uses terminology known in the field of application-portfolio management. The below glossary defines the most important of those terms, as they should be understood in this document.

Application Portfolio is a set of IT applications that an enterprise uses to run its business. The term "application" is used in a generic sense and may include software packages, modules, libraries, or services located either inhouse or on a remote cloud-computing platform.

Application Portfolio Rationalization (APR) may comprise any activity intended to reduce a portfolio's overall complexity or application footprint. The goal of an APR effort is to reduce the total cost of ownership (TCO) for an application portfolio. APR methodologies comprised by the present invention focus on increasing the quality and reducing the complexity of each application in a portfolio while minimizing the overall portfolio cost.

Application Quality of an application comprises either a quality of the "business value" that an application provides to the enterprise or a "technical quality" of the application itself.

Business Quality (BQ) measures the value of an application to a business as a function of predefined parameters that may comprise: business alignment (how well the application meets current and future business goals and how well it meets those goals), process alignment (how closely the application conforms with other business processes), functional extensibility, data quality, financial impact, and branch/line-of-business coverage.

Technical Quality (TQ) measures the overall technical currency, efficiency, and robustness of an application as a function of parameters that may comprise: technology currency (how current or out-of-date is the application's operating system, programming language, database, middleware, auxiliary software tools, infrastructure, networking resources, platform, or other technical entities); technical complexity (such as the complexity of the application's underlying technology, the application's number of interfaces and components, the application's degree of customization or lack of standardization); security; availability; performance; scalability; and degree of compliance with the business's internal architecture, platform, infrastructure, topology, or other technology standards.

Application Complexity is a function of parameters that may comprise: Technical Complexity, a Number of supported business areas (such as departments, branches, or lines of business), a number of different user roles supported, and a degree, or a number of levels, of customization.

Application Portfolio Complexity is a function of parameters that may include: a number of applications comprised by an application portfolio, the application complexity of each application, and the number of different technologies comprised by the applications.

Application cost of a portfolio application may include components like: application-support costs, the cost of resources required by an application, infrastructure costs, licensing costs, and any other operational costs, such as bandwidth-utilization costs, data-access costs, or audit costs. In practice, it can be difficult to develop an accurate estimate of all costs associated with a particular application. Some embodiments of the present invention may thus approximate application costs as a function of parameters like application complexity, overall size (such as storage requirements), average volume (such as an average number of daily transactions), or a contractually guaranteed minimum service level.

Portfolio Cost is a portfolio's overall cost to a business, generally derived as the sum of the application cost of each application in the portfolio.

A Consolidation Decision (or Consolidation Recommendation) identifies an action to be implemented upon an application of the portfolio during a rationalization activity. There are four possible consolidation decisions, each of which may be associated with a particular implementation cost:

Retain: do not alter the application during the consolidation;

Enhance: add functionality to the application in order to satisfy current or projected business needs, or to replace functionality lost when another application is decommissioned;

Modernize: update or reconfigure the application to better accommodate current or future business requirements, such as adding bandwidth in order to accommodate increases in transaction loads, or installing updates to ensure continued compatibility with newer versions of an operating system; and Decommission: reduce portfolio complexity and cost by removing the application from the portfolio.

A Consolidation Cost is the total cost associated by implementing a consolidation decision upon a particular application:

cost of retention: retaining an application usually generates no one-time cost. But a retained application, like modernized and enhanced applications, will continue to have an annual TCO that comprises maintenance and resource costs;

cost of enhancement: may be estimated by an inhouse application expert, IT personnel, or application vendor possessed of expert knowledge about the application and the environment in which it is implemented. In general, larger and more complex applications have higher enhancement costs;

cost of modernization: enhanced applications, modernized applications are associated with a one-time cost. Modernization costs may be a function of the application's current technical quality, its desired technical quality, and a business's technical standards.

cost of decommissioning: decommissioning an application results in a cost savings and a reduction in subsequent portfolio TCO, but it may also generate one-time decommissioning costs for activities like uninstallation, data archiving, and updating dependent applications.

An Application-Consolidation Opportunity of a portfolio is a set of ordered 3-tuples <A, D, C> that each identify an application A comprised by the portfolio, a consolidation recommendation or Decision D, and an implementation cost C.

$$\text{Opportunity} = \{<A_1, D_1, C_1>, <A_2, D_2, C_2>, \ldots <A_k, D_k, C_k>\}$$

In the simplest case, each 3-tuple of an opportunity identifies the cost of implementing a particular rationalization decision for a particular application A. A consolidation opportunity may thus comprise a set of costs, each of which identifies the cost of implementing a consolidation decision for one of the applications in application portfolio. In aggregate, the opportunity identifies the total cost associated with a rationalization strategy that associates a particular consolidation decision with each application of a subset of the portfolio applications.

Total Opportunity Cost is the sum of all costs $C_k$ identified by an opportunity.

Opportunity Benefit of an opportunity identifies the total benefits accrued by implementing an opportunity. A total benefit of a particular opportunity may be estimated as the difference between the current TCO of the associated portfolio and the projected TCO of the revised portfolio after the current portfolio has been rationalized by implementing the opportunity. Here, the revised portfolio comprises all applications that have not been decommissioned during the rationalization.

In some embodiments, a total benefit of an opportunity may also include non-financial benefits of a rationalization, such as a reduction in the number of applications comprised by a portfolio, or an overall reduction in portfolio complexity. A total benefit of an opportunity may also comprise a return on investment (ROI) identified by a business case. For example, if the one-time costs of an opportunity's enhancements, modernization and decommissioning are deemed to be the opportunity's "investment," an ROI on that investment might be computed as a sum of the savings produced by the decommissionings during a specified time period.

An Opportunity Set is a set of consolidation opportunities grouped together into a complete implementation. An opportunity set can be expressed as:

OpportunitySet={Opportunity$_1$, Opportunity$_2$, . . . Opportunity$_n$}

Conflicts among recommended consolidation decisions in a pair opportunities may prevent two opportunities from being included in the same opportunity set. For example, if an Opportunity$_1$ specifies enhancing an Application$_1$ in one context, but Opportunity$_2$ specifies decommissioning Application$_1$ in another context, Opportunity$_1$ and Opportunity$_2$ could not both be implemented and thus could not both be included in the same opportunity set. An opportunity set in which all opportunities in the set can be implemented without conflict may also be referred to as a feasible opportunity set.

Application Portfolio Optimization is an objective of this invention that attempts to identify the "best" opportunity set of all feasible opportunity sets. Here, a "best" set may be selected by any means known in the art as a function of whether that implementing of the set would rationalize a portfolio to produce a specific combination of business objectives. These objectives may, for example, comprise a lowest portfolio cost, a lowest portfolio complexity, a lowest number of applications comprised by the portfolio, a highest rationalization ROI, or a greatest opportunity benefit.

The present invention adds significant functionality to known APR systems by providing those systems with the ability to generate and compare candidate opportunity sets and to identify a set that is likely to satisfy desired business objectives. Some embodiments also allow users to perform what-if analyses that allow an analyst to test the efficiency, cost, robustness, or effectiveness of a portfolio, after being rationalized by a particular opportunity set, in various scenarios.

Methods of the present invention perform these tasks by means of steps that are significantly different than those performed by human analysts who attempt to manually rationalize a portfolio through traditional methods. A human-based rationalization effort may, for example, comprise many distinct phases during which the appropriateness of each portfolio application is identified by specialists as a function of those specialists' expert knowledge of a business requirement, of the application itself, of a computing or networking platform on which the application runs, or of a technological context of the application.

Analysts may then propose to various stakeholders a recommendation for the disposition of each application, who may each respond with their own recommendations, based on each stakeholder's specific priorities. Analysts would then use these recommendations to manually develop an overall portfolio-rationalization plan that meets the greatest number of stakeholder objectives.

The present invention, however, teaches a very different, quantitative solution that enhances and complements current APR systems and methodologies. This quantitative solution enables such an enhanced system to automatically select an optimal opportunity set and rationalization strategy, and to do so without human interaction. The result may be an improved, more comprehensive, technical solution that implements the steps:
  i) collecting an inventory of data about each portfolio application;
  ii) representing each application in n-dimensional parameter space;
  iii) using these representations to infer costs, complexity, relative business and technical qualities, and other second-order characteristics of each application;
  iv) determining a best recommendation for each application as a function of that application's n-dimensional representation;
  iv) developing feasible rationalization strategies based on each application's best recommendation;
  v) identifying the best of the feasible rationalization strategies; and
  vi) returning that best strategy to the APR system, which then forwards the strategy to portfolio-management personnel.

Here, given a set of consolidation opportunities selected by means known in the art, the present invention will automatically select a combination of opportunities most likely to maximize the benefits and achieve the goals of a rationalization effort.

As will be described in FIG. 2, the present invention achieves this result by:
  i) identifying all feasible opportunity sets (that is all sets of opportunities in which the implementation of no opportunity in the set precludes the implementation of another opportunity in the set)
  ii) determining the cost and benefits of each feasible opportunity set; and
  iii) ranking the opportunity sets as a function of each set's ratio of cost to benefits The resulting sorted list of opportunity sets allows architects, analysts, and other users to identify an optimal rationalization strategy that implements the highest-ranked set. Some embodiments may also allow users to test and compare highly ranked sets through interactive what-if analyses in which the sets are subjected to hypothetical post-implementation conditions.

Unlike current APR technologies, this improved APR technology does more than merely provide information that may helpful when manually developing a rationalization strategy. Instead, the present invention automatically generates entire consolidation plans, identifies which candidate plan is a best match for a business's specific objectives, and allows users to stress-test and further compare recommended plans under a variety of hypothetical scenarios.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for quality-based automated application-portfolio rationalization in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for quality-based automated application-portfolio rationalization in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for quality-based automated application-portfolio rationalization.

Any of the components of the present invention could be created, integrated, hosted, maintained, deployed, managed, serviced, supported, etc. by a service provider who offers to facilitate a method for quality-based automated application-portfolio rationalization. Thus the present invention discloses a process for deploying or integrating computing infrastructure, comprising integrating computer-readable code into the computer system 101, wherein the code in combination with the computer system 101 is capable of performing a method for quality-based automated application-portfolio rationalization.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for quality-based automated application-portfolio rationalization may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for quality-based automated application-portfolio rationalization is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
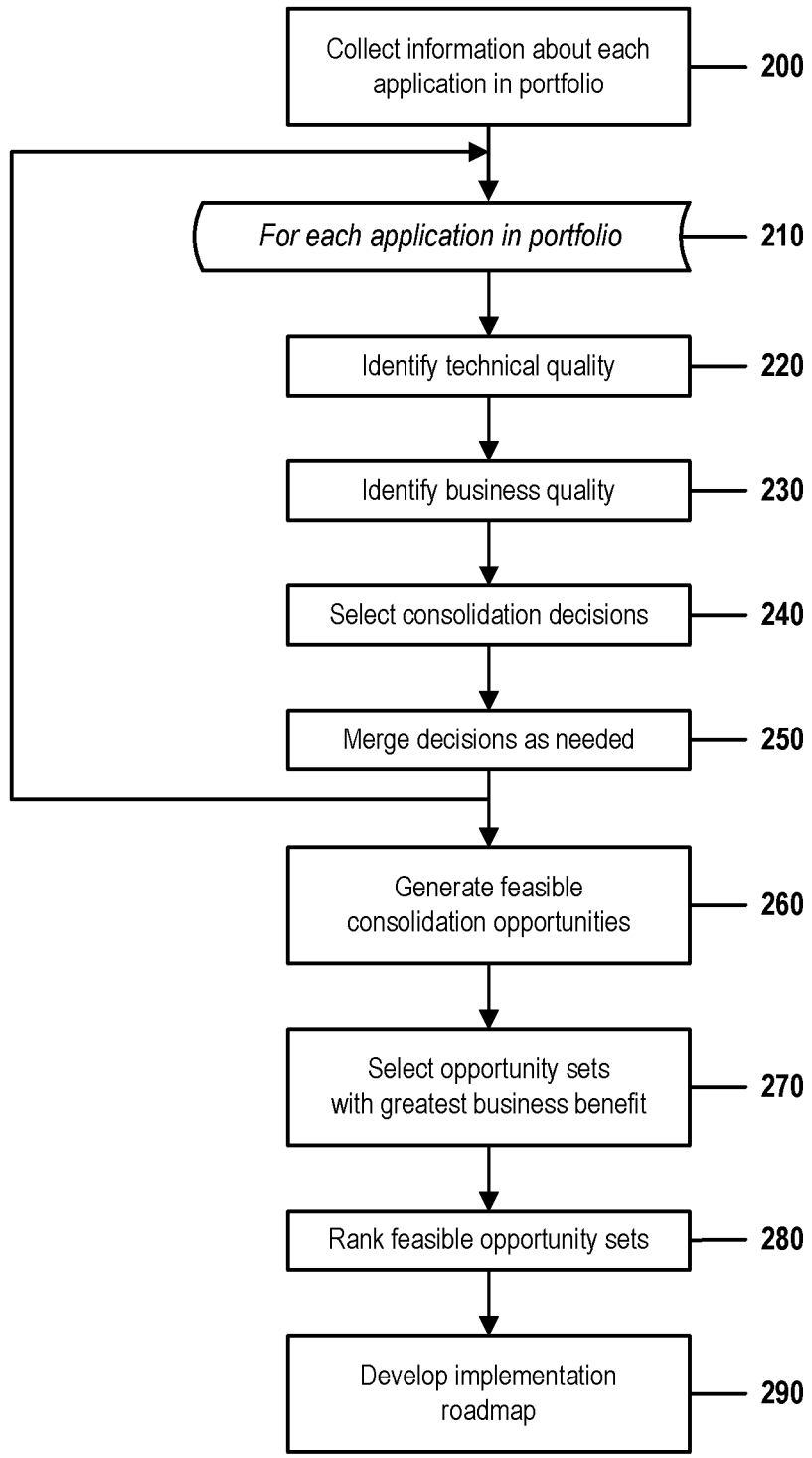
FIG. 2 is a flow chart that illustrates steps of a method for quality-based automated application-portfolio rationalization, in accordance with embodiments of the present invention.

FIG. 2 is a flow chart that illustrates steps of a method for quality-based automated application-portfolio rationalization in accordance with embodiments of the present invention. FIG. 2 shows elements identified by reference numbers 200-290.

In step 200, a processor of an enhanced application-portfolio rationalization (APR) system receives information describing software applications comprised by a business's portfolio of enterprise applications. This received information includes identification of each application and of the costs of maintaining, operating, modifying, or replacing each application.

In one example, this received information might include:
  basic information about each application, such as an application's name, version number, summary description, configuration, and key stakeholders
  business-related application information, such as an identification of whether an application is mission-critical to a business objective or must operate in a high-security environment
  non-functional application information, such as the size of an application's user base, or logged statistics about the application's performance, availability, scalability, and security
  technical details of each application, such as descriptions of an application's operating system, database, middleware, infrastructure, or other platform details
  the total cost of owning each application, including license, maintenance, and infrastructure costs
  context and interface information, such as descriptions of an application's hardware and software interfaces, and of the type and number of systems and networks to which the application must interface
  traffic and bandwidth statistics and projections, such as an application's average daily number of transactions and hourly bandwidth utilization, or the application's projected future workload and utilization, and
  support information, such as an application's average number of support tickets, updates, and change requests.

The data received in this step may be of types that are generally available through standard channels, such as budgetary records, logged performance statistics, maintenance records, enterprise-design documents, and other types of application-related data. In some embodiments, the system may also receive or generate other types of data that must be assembled manually or is derived automatically by the system itself.

Step 210 begins an iterative procedure of steps 210-250, which is performed by the system once for each application in the portfolio to be rationalized. At the conclusion of the final iteration of this procedure, the method of FIG. 2 continues with step 260.

In step 220, the system identifies, assigns, or associates a technical quality to an application of the portfolio. This technical quality may be determined manually or automatically, by any means known in the art.

In some embodiments, for example, an identification of an application's technical quality may be received as part of the application information received in step 200. In other cases, an application's technical quality may be derived through a straightforward evaluation of predetermined parameters, such as an application's age, platform, stability, scalability, user-interface characteristics, or resource consumption, or the duration of time since the application's most recent update.

For example, any application that will not run under its current operating system after that operating system's next upgrade is complete may automatically be assigned the lowest possible technical quality, regardless of the application's other positive qualities. In another case, each application may be assigned point values based on its age, the currency of its platform, the number of crashes it experiences, and other characteristics selected by the business that the application performs. Each application would then be assigned a relative technical-quality score based on its total number of points.

In yet another example, an application might have previously been assigned a relative technical-quality score by business experts or specialists as a function of a business-preferred combination of parameters like technical currency, complexity, security effectiveness, availability, performance; scalability; and standards compliance. In such cases, this score may be received by the system in step 200.

Similarly, business experts may instead have assigned scores to each parameter of such a combination of parameters. In such embodiments, if those parameters scores are received by the system in step 200, the system may in step 220 derive a technical-quality score through a straightforward computation like simply adding the parameter scores.

In all cases, any parameter or characteristic of an application that is used to derive a technical-quality score may be weighted, should an implementer determine that the selected parameters or characteristics are equally important to a determination of technical quality.

Embodiments of the present invention encompass cases where technical quality can be represented by any means known in the art, such as by a decimal number, an alphanumeric code, or a rank within a group. In a simplest example, a business may find it sufficient to represent technical quality as a binary value, such as a 0 or 1, or as either "high" or "low."

In step 230, the system identifies, assigns, or associates a business quality to an application of the portfolio. This business quality may be determined manually or automatically, by any means known in the art, including those that are analogous to the means by which a technical quality was assigned in step 220.

In some embodiments, for example, an identification of an application's business quality may be received as part of the application information received in step 200. In other cases, an application's business quality may be derived through a straightforward evaluation of predetermined parameters, such as an application's alignment with current business goals, workflows, and product road map.

For example, any application that has a TCO in excess of 40% of a business's IT budget impossible might automatically be assigned the lowest possible business quality, regardless of the application's other positive qualities. In some embodiments, each application may be assigned point values based on its business alignment, process alignment, output-data quality, financial impact, and line-of-business coverage. Each application would then be assigned a relative business-quality score based on its total number of points.

In yet another example, an application might have previously been assigned a relative business-quality score by business experts or specialists as a function of a business-preferred combination of business-related parameters like those listed above. In such cases, this score may be received by the system in step 200.

Similarly, business experts may instead have assigned scores to each parameter of such a combination of parameters. In such embodiments, if those parameters scores are received by the system in step 200, the system may in step 230 derive a business-quality score through a straightforward computation like simply adding the parameter scores.

In all cases, any parameter or characteristic of an application that is used to derive a business-quality score may be weighted, should an implementer determine that the selected parameters or characteristics are equally important to a determination of business quality.

Embodiments of the present invention encompass cases where business quality can be represented by any means known in the art, such as by a decimal number, an alphanumeric code, or a rank within a group. In a simplest example, a business may find it sufficient to represent business quality as a binary value, such as a 0 or 1, or as either "high" or "low."

In step 240, the system selects an optimal consolidation decision for an application as a function of that application's relative technical and business qualities. This selection may be performed by any means known in the art, either manually or automatically, using criteria selected by the business as a function of the business's goals and objectives.

As described above, a consolidation decision may comprise any of: retention, enhancement, modernization, or decommissioning. In some embodiments, this decision may be by simple, predefined rules, and as a function of qualities identified in steps 220 and 230.

In some embodiments, the system may in this step select a consolidation decision for a particular application as a function of whether that application's technical quality and business quality were previously determined to be "high" or "low."

One example of rules governing such a selection may be summarized in Table 1.

TABLE 1

| Business Quality | Technical Quality | Consolidation Decision |
|---|---|---|
| High | High | Retain |
| High | Low | Modernize |
| Low | High | Enhance |
| Low | Low | Decommission |

In some embodiments, more than one consolidation decision may be possible for a particular combination of technical-quality and business-quality values. For example, if an application has low business quality, but high technical quality, a business may wish to reserve the option to either enhance or decommission the application. In such cases, two consolidation decisions might be derived for the application in question, and these two decisions would be carried through the next steps of the method of FIG. 2. The two could not coexist in the same feasible opportunity set and ultimately, one of the two decisions would be eliminated in the final steps of FIG. 2.

In some embodiments, additional criteria may be used to select a consolidation decision. Some of these additional criteria may, however, be at least indirectly related to factors that underlie an applications technical or business quality.

For example, a consolidation decision to decommission an application may be at least in part based on a determination that the application's functionality overlaps with that of another application. This can occur when, for example, departments are merged, a secondary business is acquired, multiple applications are merged, legacy applications are migrated to new platforms, or when a business fails to exert centralized control over departmental applications.

In such cases, an opportunity may arise to decommission one or more applications, consolidate their functionality into a single application that has higher business quality or technical quality, and enhance the target application to comprise any unique functionality of the consolidated applications.

Similarly, a decision to decommission an application may be at least partly based on benefits perceived to accrue by decommissioning an application associated with a pattern of declining or low usage. Such a pattern may occur when a business alters its workflow or other business processes, updates its business strategy, or adopts new standards, conventions, or platforms. Such factors may be identified by received information that measures trends in application utilization, user base, or resource consumption.

A decision to decommission an application may also be at least party based on received information indicating that the application is technically obsolete. This is especially true if an application comprises technology so old that it cannot be enhanced or is no longer eligible for vendor support. If such an application is still being used in a critical business function, other applications may need to be added or enhanced in order to replace any functionality that the decommissioned application had been providing.

Certain of these additional criteria may, in some embodiments, be identified by the information received or collected in step 200. In other embodiments, certain of these criteria may be directly or indirectly inferred from the received or collected information, using known technologies and methodologies of cognitive computing, machine learning, or artificial intelligence.

For example, information received in step 200 may include a functional classification of an application and an identification of a business department that is served by an application. If the received information identifies two applications being used for word processing by the same Accounting Department, the system may infer that the two applications functionally overlap. As a result, the system may generate a first decision to decommission the older, less technically qualified of the two applications, and a second decision enhancement of the other application to provide services currently being performed by the older application.

In some embodiments, this step will associate each application in the application portfolio with no more than one decision. But other embodiments may find more than one consolidation decision feasible for a particular application. For example, it may be feasible to either enhance or modernize an application, or an enhancement may be possible, but not essential.

In step 250, a system that has associated an application with more than one consolidation decision merges those decisions to ensure that each application is identified with no more than one consolidation decision.

This merging may be done by any method desired by an implementer, based on technical and business considerations. Table 2 summarizes one exemplary set of rules by which two consolidation decisions associated with the same application may be combined into a single decision. Table 2 also shows how the system would identify implementation costs of both individual and combined decisions.

TABLE 2

| Opportunity Decision 1 | Opportunity Decision 2 | Combined Decision | Combined Implementation Cost |
|---|---|---|---|
| Retain | Retain | Retain | 0 |
| Retain | Enhance | Enhance | Cost of enhancement 2 |
| Retain | Modernize | Modernize | Cost of modernization 2 |
| Retain | — | Retain | 0 |
| Retain | Decommission | Not feasible | Not applicable |
| Enhance | Enhance | Enhance (Scope = scope of decision 1 + scope of decision 2) | Cost of combined enhancement. May be < (enh 1 cost + enh 2 cost) if decisions overlap |
| Enhance | Modernize | Enhance & Modernize | Cost of enhancement 1 + Cost of modernization 2 |
| Enhance | — | Enhance | Cost of enhancement 1 |
| Enhance | Decommission | Not feasible | Not applicable |
| Modernize | Modernize | Modernize | Cost of combined modernization. May be < (mod 1 cost + mod 2 cost) |
| Modernize | Decommission | Not feasible | Not applicable |
| Modernize | — | Modernize | Cost of modernization |
| Decommission | Decommission | Decommission | Decommissioning costs |
| Decommission | — | Decommission | Decommissioning costs. Application can be decommissioned without any impact on decision 2 costs. |

At the conclusion of step 250 during the final iteration of the iterative procedure of steps 210-250, the system will have identified at most one consolidation decision for each application in the application portfolio. The method of FIG. 2 then continues with step 260.

In step 260, the system generates a list of candidate application-consolidation opportunities. This list may not include all possible opportunities, but each identified opportunity may associate each application of a subset of the portfolio applications with a consolidation decision identified in step 250.

Each opportunity takes the form of a set of triplets of the form <A,D,C>, where A is an application of the portfolio, D is a consolidation decision associated with application A during step 250, and C is a cost associated with implementing decision D on application A. C may be based on information received or collected in step 200, such as licensing, upgrade, maintenance, and other costs associated with a business's known application TCO and related costs. If multiple decisions are identified in step 240 for the same application, the cost of a resulting single consolidated decision for that application may be determined by methods similar to those described in step 250.

An application-consolidation opportunity that comprises k decisions and k costs for a set of portfolio applications may thus be expressed as:

$$ACO_k = \{<A_1, D_1, C_1>, <A_2, D_2, C_2>, \ldots <A_k, D_k, C_k>\}$$

An opportunity that comprises k triplets may not, however, be associated with a portfolio that comprises k applications. In some cases, no decision may be associated with certain applications, or two non-exclusive decisions may be associated with the same application. For example, it may be possible to perform two types of enhancements on a single application, where each enhancement affects one of two of the application's features but has no effect on the other feature.

Some embodiments of the present invention may be configured, if desired by an implementer, such that every opportunity consists of k triplets for a portfolio of k applications. For example, in the preceding example, the two "enhance" triplets might be combined into a single two-phase "enhance" decision (and costed accordingly), and if an application lacks a corresponding triplet, an arbitrary or temporary placeholder triplet (perhaps a "retain for now" decision and either zero cost or cost equal to the application's current ongoing cost of ownership) would be added to the opportunity to denote this fact.

The number of possible opportunities may increase geometrically or exponentially with the number of applications in a portfolio. The number of feasible opportunities, however, may not increase as quickly because some sets of triplets will not be feasible. As described above, if two decisions apply mutually exclusive actions to the same application—such as a first decision to retain the application and a second decision to decommission the application—no opportunity may feasibly comprise both of those mutually exclusive decisions. Similarly, if two applications are in a known dependency relationship, certain pairs of decisions associated with those two applications might be infeasible in combination. For example, if a proprietary rendering module can be hosted only by a specific graphics application, no feasible opportunity could comprise both a decision to enhance the rendering module and a decision to decommission the graphics application.

In step 270, the system identifies feasible opportunity sets that each consist of a feasible combination of the feasible opportunities identified in step 260. These opportunity sets are selected as a function of their ability to meet rationalization objectives by providing the greatest business benefit or ROI.

One benefit of the present invention is its ability to efficiently identify opportunity sets that are most likely to meet a business's rationalization objectives by quantifying those objectives as each possible set's aggregate ROI or "opportunity benefit." A first step toward identifying such a subset is to determine which combinations of opportunities would be feasible if combined into the same opportunity set, and to then determine which of the resulting feasible sets have greater benefits. Because even only a few hundred identified decisions are capable of being combined into an enormous number of opportunities, and an even larger number of opportunity sets, existing application-portfolio rationalization systems are not able to select and manage, much less intelligently evaluate or rank, feasible opportunity sets in a similar manner.

The present invention may theoretically select opportunity sets by various means known in the art, including by application of known optimization algorithms. Most of these methods, however, are prohibitively resource-intensive and are not practical in a real-world environment.

Figure 4:
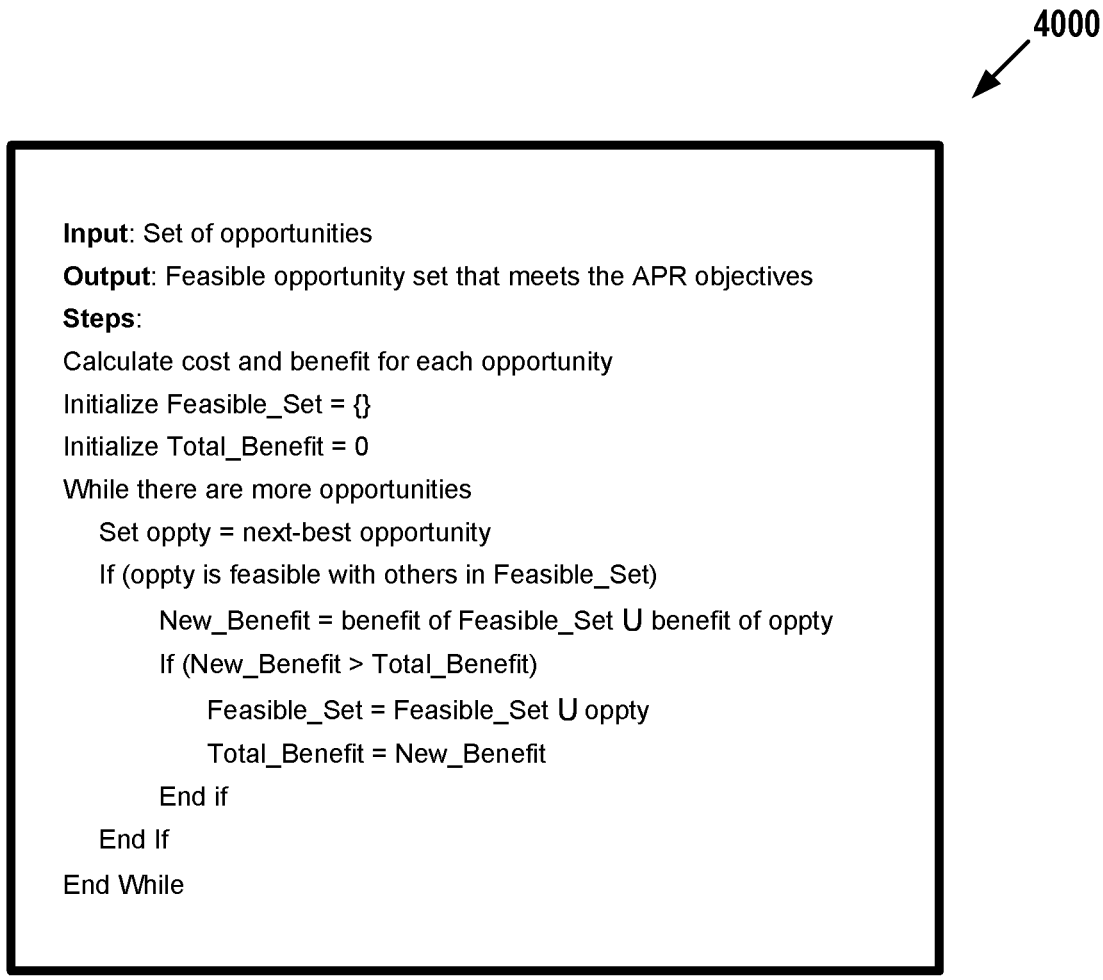
FIG. 4 shows pseudocode for integrating a greedy algorithm into an embodiment of the present invention, in accordance with embodiments of the present invention.

Embodiments described in FIGS. 2-4 address this problem by adapting one or both of two specific methods of approximating an optimization algorithm, and by applying these adaptations in a context where an "optimal" opportunity set is one that is associated with an inflection point (that is, at least a local maximum) of the ROI or business benefit capable of being returned by an opportunity set.

These two methods of selecting a feasible opportunity set comprise: i) a brute-force method that generates all feasible combinations of opportunities and then ranks the generated combinations as a function of each combination's business benefit or ROI; or ii) a highly efficient quasi-optimization application of a "greedy algorithm" that selects an opportunity set associated with a local maximum degree of business benefit or ROI.

The examples and figures presented in this document should not be construed to limit embodiments of the present invention to these two classes of algorithms. These two types of algorithm are described here for pedagogical purposes, to illustrate how the present invention might be implemented in a real-world environment. Similarly, the pseudocode descriptions of FIGS. 3 and 4 should not be construed to limit embodiments of the present invention to the precise algorithm, steps, instructions, or language shown in the figures. Other embodiments may comprise any programming language, scripting language, computing platform, standards, or conventions known in the art that are capable of implementing algorithms analogous to those described in the figures.

Embodiments of the present invention may apply other types of optimization techniques in a similar manner, so long as those techniques are capable of determining which feasible opportunity sets provide relatively greater or lesser degrees of business benefit or ROIs, based on criteria described above and in the glossary, such as complexity, technical quality, business quality, implementation cost, and TCO. The examples of FIGS. 3 and 4 merely describe specific types of algorithms that, when adapted and applied in the novel manner described in this document, are particularly well-suited to efficiently producing the desired results of the present invention.

The first of these two methods, by generating and ranking all possible opportunity combinations, allows business and technical experts to further evaluate recommended feasible opportunities in a more nuanced manner by performing what-if analyses on each identified opportunity set. This may be useful when an opportunity combination that is technically the most feasible is capable of being rendered infeasible for reasons that cannot be known by the system or that are not known to be certain to occur. For example, if there is a possibility that the business currently managing the application portfolio may be acquired during the next fiscal year, the business may not want to consider an otherwise-feasible opportunity that enhances applications that would not survive such an acquisition.

An example of the first method is described in FIG. 3 by pseudocode 3000 for generating all possible combinations of opportunities for a given opportunity set.

The example of pseudocode 3000 comprises a function GenerateCombinations that:

i) assembles a set of all possible feasible opportunity sets by combining subsets of the set of opportunities identified in steps 260;

ii) identifies the revised application portfolio that results from applying each generated opportunity set to the original portfolio; and iii) calculates the resulting total portfolio cost of each resulting revised portfolio.

After applying this function to the first opportunity under consideration, the algorithm next sorts the resulting combinations of decisions in order of their associated target portfolio costs. The algorithm continues in this manner, successively applying the GenerateCombinations function to generate additional combinations, each time adding one more of the remaining opportunities under consideration to the existing set of combinations. At each step, the algorithm performs an isFeasible function that returns a TRUE value only if the combination currently being considered is feasible.

If, for example, a previously derived opportunity set contains a decision to retain an application, isFeasible would return a FALSE value if the algorithm attempts to combine the set with an opportunity containing a decision to decommission the same application.

At the conclusion of the algorithm described by pseudocode 3000, the system will have created a list of all feasible opportunity sets based on the opportunities identified in step 260, and will have sorted those opportunity sets in order of their respective business benefits.

FIG. 4 shows pseudocode 4000 describing an exemplary adaptation of a "greedy algorithm" method to create a second, more efficient, method for identifying a high-benefit opportunity set. Certain embodiments may, at the discretion of an implementer, substitute such a "greedy" procedure for the type of method described in FIG. 3. Although methods of FIG. 4 may not necessarily identify an opportunity set that has an ROI as the optimal set identified by a method of FIG. 3, this second class of methods is far more efficient, and requires far fewer resources and run time than do comparable implementations based on methods of the type shown in FIG. 3.

Some embodiments may use both types of procedures and then compare the two sets of results. An implementer might decide to perform these extra steps to double-check the results produced by each algorithm, to identify opportunity sets that occur in both result sets as being more likely to be beneficial, or to produce a larger result set that better identifies combinations likely to offer greater benefit.

One characteristic of many greedy-algorithm implementations is their extraordinarily efficient way of approximating a solution to an optimization problem. Because they do not necessarily identify a best possible solution, greedy algorithms may be applied to very large data sets that would otherwise require a burdensome computational procedure. Even if a greedy algorithm does not identify a globally best solution, it may select a solution that is close enough to the true optimal solution to be satisfactory.

A detailed description of greedy algorithm applications is beyond the scope of this document, but well-known concepts and techniques of "greedy" optimization are documented in many textbooks and online references. In general terms, when a greedy algorithm performs an iterative optimization procedure upon a set of candidate solutions, the algorithm, during each iteration, selects the best candidate solution from a small, "local" subset of possible solutions that are available at that iteration, rather than performing very large numbers of complex computations needed to identify a single, globally optimal solution.

This "best local solution" may merely provide the greatest improvement over the most recently selected previous local solution. For example, when traversing a path of a tree data structure in search of the tree's highest-numbered node, a greedy algorithm may at each node along the path merely proceed to the highest-numbered adjacent node until it can no longer find a higher-numbered neighbor. Although a greedy algorithm in this example may never identify the highest-numbered node in the entire tree (and may not even traverse every node or every path of the tree), the algorithm does find a local maximum and may do so in far fewer steps than would be required for a full traversal of every possible path.

Although there is no guarantee that a greedy algorithm will ultimately lead to a globally optimal solution, greedy algorithms assume that a relatively small number of local selections are likely in aggregate to lead to a solution that is acceptably close to the globally optimal solution.

This approach is summarized in the pseudocode 4000 of FIG. 4, which describes at a high level one possible strategy for incorporating a greedy algorithm into the present invention. In some embodiments, an implementer may combine such an approach with an additional procedure based on methods analogous to those of FIG. 3, and that attempts to find a true maximum of all or part of the set of opportunities identified in step 260.

The example of pseudocode 4000 comprises an iterative "while" procedure that is performed once for every opportunity to be considered. During each iteration, the procedure first determines whether the current (or local) "best" opportunity (where "best" is identified as a function of the opportunity's TCO benefit) may be feasibly combined with opportunity sets assembled during previous iterations. For example, an embodiment that follows guidelines analogous to those of Table 2 might determine that it would be infeasible to combine an opportunity that decommissions an application with an existing opportunity set that retains, enhances, or modernizes that same application.

If the local "best" opportunity under consideration is found to be capable of being feasibly combined with an existing opportunity set, a "new benefit" is identified as a union of the benefit of the local opportunity and of the benefit of the existing combination. The local opportunity's benefit may be determined as a function of the local opportunity's ROI, as described above in the glossary entry for "Opportunity Benefit" and in Table 2. The benefit of the existing opportunity set may be determined as a union of the benefits of each opportunity comprised by the set. Note that the union of the two benefits may be greater than, lesser than, or equal to the benefit of the existing opportunity set alone.

If the union is greater than the total benefit of the opportunity set, then the opportunity under consideration is added to the set, the total benefit of the combination is updated to equal the union, and system considers combining the next opportunity with each previously generated feasible opportunity set. In this way, a feasible local opportunity may be combined with a local opportunity set only if doing so increases the total benefit to the business of the local opportunity set.

At the conclusion of the last iteration of the procedure of FIG. 3, the system will have selected an opportunity set as a function of that set's benefit to the business. Here, as described in the glossary, the benefit of each opportunity, each opportunity set, and each combination of an opportunity and an opportunity set is determined as a function of return on investment.

In some embodiments, including those in which new information may be received about an application portfolio or in which a new business or technical decision may be made about an application, procedures analogous to those of FIG. 3 or analogous to those of FIG. 4 may be performed repeatedly, generating a potentially different combination each time. An embodiment might, for example, consider the opportunities of an opportunity set in a different order each time that a procedure of FIG. 3 or FIG. 4 is performed. In other cases, the system may perform procedures analogous to those of FIG. 3 or FIG. 4 in order to generate multiple sets of opportunity sets, where each set of sets combines a different subset of the opportunities identified in step 260. In all cases, the goal of these procedures is to find a feasible combination of opportunities that provides a greatest benefit or that, at worst, provides a benefit that meets a predefined business requirement. The present invention is flexible enough to accommodate any such implementation variations desired by an implementer, where a larger number of computational steps will require more resources and more time, but are more likely to identify combinations that have greater benefit.

Some embodiments may offer a user the ability to interactively run such analogous procedures on a subset of the opportunities of step 260, where the subset is selected by the user, or is generated by a user revision to a system-selected opportunity. These capabilities may allow a user to perform ad hoc what-if analyses to compare relative benefits provided by different opportunity sets of interest.

In step 280, the system orders the opportunity sets identified in step 270 according to their ability to meet rationalization objectives. This means arranging the sets in order of the total benefit that each opportunity set provides to the business. In some embodiments, this procedure may be performed quickly by comparing the total cost of each opportunity set, where an opportunity set's total cost is simply the sum of the cost of each opportunity comprised by the set.

In more sophisticated embodiments, a total cost of an opportunity set may be revised as a function of dependencies or other relationships among the opportunities comprised by the set. For example, decommissioning a first application may increase an enhancement cost of a second application. Such revisions maybe performed as a function of information received in step 200.

In yet other embodiments, the opportunity sets may be ordered by the relative cost of the application portfolio after the opportunities comprised each opportunity set are implemented. For example, if a first opportunity set decommissions 20 of a portfolio's 100 applications, the TCO of the remaining 80 applications would be associated with the first opportunity set. Similarly, if a second opportunity set decommissions 32 of the 100 applications, the relative cost of the second opportunity set would comprise the TCO of the remaining 68 applications. Comparing the benefits of the two sets would then be performed by comparing the resulting two opportunity-set costs.

In step 290, some embodiments may generate, or may provide input data to facilitate the generation of, a detailed implementation roadmap that identifies resource requirements, timelines, dependencies, schedules, and costs for implementing the decisions of each compared opportunity set. In other cases, such a roadmap may be generated or facilitated only for a most beneficial opportunity set or for those opportunity sets that provide sufficient benefit to be presented for consideration by business or technical experts. Such roadmaps may be generated by any means known in the art, such as by means of an automated project-planning or project-management application.

If such a roadmap is generated, it may be electronically shared with or submitted as input to downstream systems for the purpose of implementing the technical decisions identified by a selected opportunity map.

In some embodiments, the system may in this step automatically improve or add functionality to an existing downstream automated project-management, project-planning, resource-management, or scheduling system by providing input from which such a downstream system may manage the implementation of decisions comprised by a selected opportunity set. In such cases, the system may be incorporated into one of these downstream systems as an integrated module that solves a technical problem or limitation of the downstream system.

In embodiments in which the method of FIG. 2 is implemented as an improvement, enhancement, embedded module, or other component of an existing project-management, project-planning, scheduling, or resource-management application, step 290 may include directing the existing application to decommission portfolio applications that are identified for decommissioning by a selected opportunity set. In other embodiments, the system may in step 290 actually perform the decommissioning.

Similarly, certain embodiments may in step 290 may direct the existing application to perform upon the portfolio some or all decisions specified by the selected opportunity set or may itself, either as a distinct module or as an embedded component of the existing application, actually perform some or all of such decisions.

At each stage of steps 280 and 290, certain embodiments may also add steps that provide human or automated experts the ability to review, consider, or otherwise analyze the system's interim results or recommendations in order to allow the experts to make updates or revisions, to provide additional input, to integrate the system's output into information generated by other systems, or to perform ad hoc analyses of candidate consolidation decisions, opportunities, opportunity sets, costs, or road maps.

The method of FIG. 2 is further illustrated by the simplified example of Tables 3-6.

Table 3 shows characteristics of each application in an exemplary application portfolio. This data may be part of the information received by the system in step 200.

TABLE 3

| Application | Cost | Complexity | Size |
|---|---|---|---|
| A1 | 5000 | Medium | High |
| A2 | 4000 | Low | Medium |
| A3 | 3000 | Low | Low |
| A4 | 3500 | Low | Very low |
| A5 | 8000 | High | Very high |

TABLE 3-continued

| Application | Cost | Complexity | Size |
|---|---|---|---|
| A6 | 6500 | High | High |
| A7 | 2500 | Medium | Medium |
| A8 | 750 | Very low | Low |
| A9 | 8000 | Very high | Medium |
| A10 | 3500 | Very low | High |

Seven candidate opportunities are identified. Table 4 lists the application, decision, and cost of each triplet comprised by each opportunity.

TABLE 4

| Opportunity | Application | Decision | Cost |
|---|---|---|---|
| Opp1 | A1 | Retain | 0 |
|  | A2 | Enhance | 500 |
|  | A3 | Decommission | 200 |
| Opp2 | A1 | Decommission | 200 |
|  | A3 | Retain | 0 |
|  | A6 | Decommission | 200 |
| Opp3 | A2 | Retain | 0 |
|  | A4 | Enhance | 500 |
|  | A5 | Decommission | 200 |
| Opp4 | A3 | Retain | 0 |
|  | A4 | Modernize | 400 |
|  | A5 | Enhance | 500 |
|  | A6 | Decommission | 200 |
| Opp5 | A1 | Retain | 0 |
|  | A3 | Enhance | 500 |
|  | A4 | Modernize | 400 |
|  | A9 | Decommission | 200 |
| Opp6 | A2 | Retain | 0 |
|  | A5 | Enhance | 500 |
|  | A9 | Decommission | 200 |
|  | A10 | Decommission | 300 |
| Opp7 | A7 | Decommission | 200 |
|  | A8 | Decommission | 300 |

Not all opportunities can be implemented in the same opportunity set. For example, Opp1 and Opp2 specify a conflicting, infeasible combination of recommendations for application A1. It is possible to assemble 35 feasible opportunity sets from the opportunities listed in Table 4. Table 5 lists seven highest-benefit opportunity sets, which will compared and subjected to more detailed analysis.

TABLE 5

| Opportunity Set | Opportunities |
|---|---|
| 1 | Opp2, Opp6, Opp7 |
| 2 | Opp2, Opp4, Opp6, 0pp7 |
| 3 | Opp2, Opp6 |
| 4 | Opp2, Opp4, Opp6 |
| 5 | Opp2, Opp3, Opp7 |
| 6 | Opp6, Opp6, Opp7 |
| 7 | Opp4, Opp5, Opp6, Opp7 |

Table 6 compares the selected opportunity sets in order for the system to select the opportunity set that will provide the greatest benefit. Note that opportunity sets 5, 6, and 7 decommission a larger number of applications than sets 3 and 4, but do not provide greater ROIs. Sets 1 and 2 offer the greatest number of decommissioning opportunities and the highest savings. Although Set 1 comprises a lower number of opportunities than does Set 2, Set 1 offers greater savings because Set 2 has a higher implementation cost.

In a real-world application of the present invention, similar observations—and many other types of observations—may be revealed by means of similar procedures and presentations. Similar tables may also be manipulated, compared, and further analyzed in real-time by users by means of an interactive interface of an ad hoc "what-if" analysis module.

Results like those shown in Tables 5 and 6 may be further processed, formatted, and transmitted to downstream applications in order to support and enhance automated project-planning, project-management, resource-management, and scheduling systems.

TABLE 6

| Set | Implementation Cost | Revised Portfolio Cost | Savings | # of Decomissn'd-Apps |
|---|---|---|---|---|
| 1 | 1900 | 104,124 | 143,148 | 6 |
| 2 | 2300 | 104,524 | 142,748 | 6 |
| 3 | 1400 | 121,582 | 125,690 | 4 |
| 4 | 1800 | 121,982 | 125,290 | 4 |
| 5 | 1600 | 123,164 | 124,108 | 5 |
| 6 | 2100 | 131,952 | 115,320 | 5 |
| 7 | 2600 | 132,452 | 114,820 | 5 |

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. An application-portfolio rationalization module of an application-portfolio management system comprising a processor, a memory coupled to the processor, and a computer-readable hardware storage device coupled to the processor, the storage device containing program code configured to be run by the processor via the memory to implement a method for quality-based automated application-portfolio rationalization, the method comprising:

receiving, by the system, information about a portfolio of software applications, where the received information identifies the costs of maintaining, operating, modifying, or replacing each application of the portfolio;

assigning, by the system, to each application of the portfolio a technical-quality value and a business-quality score;

associating, by the system, each application of the portfolio with at least one rationalization decision,
where applying a first rationalization decision to a first application incurs a first rationalization cost, and
where the first rationalization decision and the first rationalization cost are determined as a function of the received information, of a complexity of the first application, of a technical-quality value-of the first application, and of a business-quality score of the first application that is based on a business alignment, a process alignment, an output-data quality, a financial impact, and a line-of-business coverage of the first application;

generating, by the system, all feasible consolidation opportunities, where each opportunity of the generated opportunities identifies a unique nonconflicting subset of the associated rationalization decisions;

selecting, by the system, two or more feasible opportunity sets, where each set of the selected opportunity sets identifies a unique nonconflicting subset of the generated consolidation opportunities;

predicting, by the system, a return on investment of each selected opportunity set;

choosing, by the system, an optimal opportunity set of the selected opportunity sets that provides a greatest return on investment; and decommissioning, by the system, portfolio applications identified by the optimal opportunity set as being subject to decommissioning,
where a particular application is deemed to be subject to decommissioning if the optimal opportunity identifies that decommissioning the particular application sufficiently reduces the portfolio's subsequent total cost of ownership to produce an overall cost savings.

2. The system of claim 1, further comprising:

consolidating, by the system, two rationalization decisions associated with a same application of the portfolio into a single consolidated rationalization decision, where the single consolidated rationalization decision is associated with a consolidated rationalization cost that is a function of a sum of rationalization costs associated with the two rationalization decisions.

3. The system of claim 2, where the consolidating is performed according to consolidation guidelines specifying that:

a first decision to retain is consolidated with a second decision to enhance into a consolidated decision to enhance, a first decision to retain is consolidated with a second decision to modernize into a consolidated decision to modernize, a first decision to enhance is consolidated with a second decision to modernize into a consolidated decision to both enhance and modernize, and a first decision to decommission may not be consolidated with a second decision to perform any action other than to decommission.

4. The system of claim 1, where a technical-quality value-of the first application is a measure of a technical sophistication of the first application.

5. The system of claim 1, where a technical-quality value-of the first application is a measure of a value of the first application to a business that uses the application.

6. The system of claim 1, where the first rationalization decision is selected from the group consisting of: retain the first application in its current form, decommission the first application, enhance the first application with additional functionality, and modernize the first application by updating it to better serve current or projected requirements.

7. The system of claim 1, where a first opportunity of the feasible consolidation opportunities comprises a set of triplets that each identify a specific application of portfolio, a specific rationalization decision associated with the specific application, and a specific cost incurred by applying the specific rationalization decision to the specific application.

8. The system of claim 1, where the system uses a greedy algorithm to select the two or more feasible opportunity sets, to associate each selected opportunity set with a return on investment, and to choose the optimal opportunity set.

9. The system of claim 1, where the system selects the two or more feasible opportunity sets, associates each opportunity set with a return on investment, and chooses the optimal opportunity set by computing a return on investment for each possible nonconflicting subset of the generated consolidation opportunities, where a return on investment of a first subset is computed as a function of a sum of costs associated with every decision comprised by the first sub set.

10. A method for quality-based automated application-portfolio rationalization, the method comprising:
   an application-portfolio rationalization module of an application-portfolio management system receiving information about a portfolio of software applications, where the received information identifies the costs of maintaining, operating, modifying, or replacing each application of the portfolio;
   the system assigning to each application of the portfolio a technical-quality value and a business-quality score;
   the system associating each application of the portfolio with at least one rationalization decision,
      where applying a first rationalization decision to a first application incurs a first rationalization cost, and
      where the first rationalization decision and the first rationalization cost are determined as a function of the received information, of a complexity of the first application, of a technical-quality value-of the first application, and of a business-quality score of the first application that is based on a business alignment, a process alignment, an output-data quality, a financial impact, and a line-of-business coverage of the first application;
   the system consolidating two rationalization decisions associated with a same application of the portfolio into a single consolidated rationalization decision,
      where the single consolidated rationalization decision is associated with a consolidated rationalization cost that is a function of a sum of rationalization costs associated with the two rationalization decisions;
   the system generating all feasible consolidation opportunities, where each opportunity of the generated opportunities identifies a unique nonconflicting subset of the associated-ef rationalization decisions;
   the system selecting two or more feasible opportunity sets, where each set of the selected opportunity sets identifies a unique nonconflicting subset of the generated consolidation opportunities;
   the system predicting a return on investment of each selected opportunity set;
   the system choosing an optimal opportunity set of the selected opportunity sets that provides a greatest return on investment; and
   the system decommissioning portfolio applications identified by the optimal opportunity set as being subject to decommissioning,
      where a particular application is deemed to be subject to decommissioning if the optimal opportunity identifies that decommissioning the particular application sufficiently reduces the portfolio's subsequent total cost of ownership to produce an overall cost savings.

11. The method of claim 10, where a technical-quality value of the first application is a measure of a technical sophistication of the first application and where a business-quality value of the first application is a measure of a value of the first application to a business that uses the application.

12. The method of claim 10, where the first rationalization decision is selected from the group consisting of: retain the first application in its current form, decommission the first application, enhance the first application with additional functionality, and modernize the first application by updating it to better serve current or projected requirements.

13. The method of claim 10, where a first opportunity of the feasible consolidation opportunities comprises a set of triplets that each identify a specific application of portfolio, a specific rationalization decision associated with the specific application, and a specific cost incurred by applying the specific rationalization decision to the specific application.

14. The method of claim 10, further comprising providing at least one support service for at least one of creating, integrating, hosting, maintaining, and deploying computer-readable program code in the computer system, wherein the computer-readable program code in combination with the computer system is configured to implement the receiving, the assigning, the associating, the consolidating, the generating, the selecting, the predicting, the choosing, and the decommissioning.

15. A computer program product, comprising a computer-readable hardware storage device having a computer-readable program code stored therein, the program code configured to be executed by an application-portfolio rationalization module of an application-portfolio management system comprising a processor, a memory coupled to the processor, and a computer-readable hardware storage device coupled to the processor, the storage device containing program code configured to be run by the processor via the memory to implement a method for quality-based automated application-portfolio rationalization, the method comprising:
   receiving, by the system, information about a portfolio of software applications, where the received information identifies the costs of maintaining, operating, modifying, or replacing each application of the portfolio;
   assigning, by the system, to each application of the portfolio a technical-quality value and a business-quality score;
   associating, by the system, each application of the portfolio with at least one rationalization decision,
      where applying a first rationalization decision to a first application incurs a first rationalization cost, and
      where the first rationalization decision and the first rationalization cost are determined as a function of the received information, of a complexity of the first application, of a technical-quality value-of the first application, and of a business-quality score of the first application that is based on a business alignment, a process alignment, an output-data quality, a financial impact, and a line-of-business coverage of the first application;
   consolidating, by the system, two rationalization decisions associated with a same application of the portfolio into a single consolidated rationalization decision,
      where the single consolidated rationalization decision is associated with a consolidated rationalization cost that is a function of a sum of rationalization costs associated with the two rationalization decisions;
   generating, by the system, all feasible consolidation opportunities, where each opportunity of the generated opportunities identifies a unique nonconflicting subset of the associated rationalization decisions;
   selecting, by the system, two or more feasible opportunity sets, where each set of the selected opportunity sets identifies a unique nonconflicting subset of the generated consolidation opportunities;
   predicting, by the system, a return on investment of each selected opportunity set;

choosing, by the system, an optimal opportunity set of the selected opportunity sets that provides a greatest return on investment; and decommissioning, by the system, portfolio applications identified by the optimal opportunity set as being subject to decommissioning, where a particular application is deemed to be subject to decommissioning if the optimal opportunity identifies that decommissioning the particular application sufficiently reduces the portfolio's subsequent total cost of ownership to produce an overall cost savings.

16. The computer program product of claim 15, where a technical-quality value of the first application is a measure of a technical sophistication of the first application and where a business-quality value of the first application is a measure of a value of the first application to a business that uses the application.

17. The computer program product of claim 15, where the first rationalization decision is selected from the group consisting of: retain the first application in its current form, decommission the first application, enhance the first application with additional functionality, and modernize the first application by updating it to better serve current or projected requirements.

18. The computer program product of claim 15, where a first opportunity of the feasible consolidation opportunities comprises a set of triplets that each identify a specific application of portfolio, a specific rationalization decision associated with the specific application, and a specific cost incurred by applying the specific rationalization decision to the specific application.

19. The computer program product of claim 15, where the system uses a greedy algorithm to select the two or more feasible opportunity sets, to associate each selected opportunity set with a return on investment, and to choose the optimal opportunity set.

* * * * *